(12) United States Patent
Burns

(10) Patent No.: US 11,297,185 B1
(45) Date of Patent: Apr. 5, 2022

(54) SYSTEMS AND METHODS FOR CONFERENCE CALL SYSTEM MANAGEMENT

(71) Applicant: Christopher Alexander Burns, Salt Lake City, UT (US)

(72) Inventor: Christopher Alexander Burns, Salt Lake City, UT (US)

( * ) Notice: Subject to any disclaimer, the term of this patent is extended or adjusted under 35 U.S.C. 154(b) by 0 days.

(21) Appl. No.: 17/148,882

(22) Filed: Jan. 14, 2021

(51) Int. Cl.
*H04M 3/42* (2006.01)
*H04M 3/56* (2006.01)
*H04L 65/403* (2022.01)
*H04L 65/1069* (2022.01)
*H04L 65/1093* (2022.01)

(52) U.S. Cl.
CPC ........ *H04M 3/566* (2013.01); *H04L 65/1069* (2013.01); *H04L 65/403* (2013.01); *H04L 65/1093* (2013.01); *H04M 2201/40* (2013.01)

(58) Field of Classification Search
CPC .............. H04M 3/566; H04M 2201/40; H04L 65/1069; H04L 65/403; H04L 65/1093
USPC .................. 379/204.01, 202.01, 158, 201.01
See application file for complete search history.

(56) References Cited

U.S. PATENT DOCUMENTS

| | | | |
|---|---|---|---|
| 7,821,412 B2 * | 10/2010 | Fink ...................... | G08B 17/11 340/629 |
| 9,253,262 B2 * | 2/2016 | Zhang ..................... | H04L 67/16 |
| 10,348,868 B2 * | 7/2019 | Ellison ................. | H04L 41/0893 |
| 2003/0174657 A1 * | 9/2003 | Qin ........................ | H04M 7/006 370/260 |
| 2014/0304763 A1 * | 10/2014 | Ma .......................... | H04L 63/02 726/1 |
| 2018/0013866 A1 * | 1/2018 | Herbert ............... | H04L 65/1069 |
| 2020/0220921 A1 * | 7/2020 | Hulick, Jr ............. | H04L 67/322 |

* cited by examiner

*Primary Examiner* — William J Deane, Jr.
(74) *Attorney, Agent, or Firm* — David A. Jones; Nadesan Beck P.C.

(57) ABSTRACT

A system for facilitating the remote control of existing conference call systems. A company may use the system to allow a remote user interface to administer calls on its existing conference call system. The system may integrate web browsers and conference call systems using a socket policy server module, facilitating access to the features and data of the conference call system for the purpose of creating remote management user interfaces.

20 Claims, 3 Drawing Sheets

SYSTEMS AND METHODS FOR CONFERENCE CALL SYSTEM MANAGEMENT

TECHNICAL FIELD

The present disclosure is related to systems and method for managing conference call systems, and more particularly to conference call system management systems and methods for integration with existing conference call systems.

BACKGROUND

Conference call systems that facilitate communication between multiple participants are increasingly being used. However, it may be difficult to manage conference call systems. For example, it may be difficult to remotely manage conference call systems, as it may be difficult to establish a connection between a remote user interface and a conference call system. Accordingly, improvements in conference call system management techniques are needed.

SUMMARY

Methods and systems are disclosed for facilitating the remote management of conference systems. A web browser may include a user interface and a socket client and a conference system may include a socket server. The user interface may initiate a request to connect to the conference system. Based on the request from the user interface, a socket policy request may be generated. The socket policy request may be configured to initiate a connection between the socket client and the socket server. If the socket policy request is valid, a connection may be established between the socket client and the socket server. If the socket client is successfully connected to the socket server, a control socket may be established between the user interface and the conference system. Once established, the control socket may allow the user interface to control at least one feature of the conference system. For example, the user interface may be able to subscribe to voice events, access or edit listings of conferences or conference participants on the conference system, mute or unmute one or more participants in a conference on the conference system, or remove one or more participants of a conference from a conference on the conference system.

BRIEF DESCRIPTION OF DRAWINGS

The accompanying drawings, which are incorporated in and constitute a part of this specification, illustrate embodiments and together with the description, serve to explain the principles of the methods and systems.

DETAILED DESCRIPTION

Figure 1:
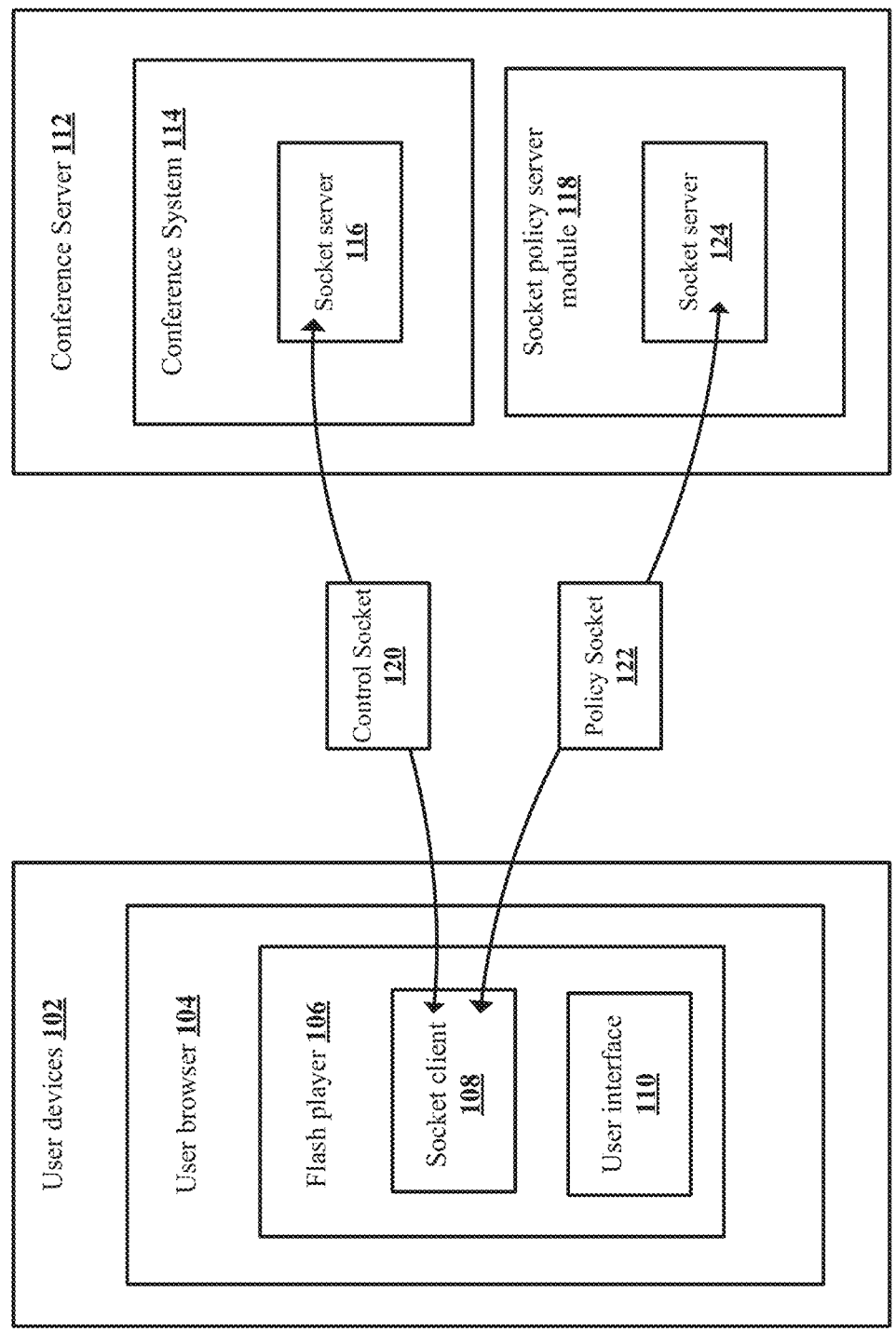
FIG. 1 illustrates a block diagram of an example system according to an embodiment of the present disclosure.

It may be advantageous for a company to allow remote management of its conference call system. For example, it may be advantageous for a company to allow a remote user access to the features and data of its conference call system so that the remote user may control the conference call system, such as by administering conference calls on the conference call system. The remote user may be given access to the features and data of the conference call system by allowing a user interface (UI) associated with the remote user to control the conference call system through the conference call system's application programming interface (API). If the UI is configured to control the conference call system through the conference call system's API, the remote user may be able to control aspects of the conference call system. For example, the remote user may be able to detect voice activity of conference call participants, view listings of all available conference calls, view listings of individual conference call participants within a given conference call, mute or unmute individual conference call participants, mute or unmute all conference call participants simultaneously (excluding the leader of the conference call), or remove one or more conference call participants from the conference call.

It may be difficult for a company with an existing conference call system to configure the existing conference call system so that it can communicate with a UI associated with a remote user. Options for facilitating real-time communication between a web browser and a server-side application are limited. One such option is to use Flash Player technology—the Flash Player running in a customer's browser can make direct socket connections to backend services, provided that a socket policy server can be queried and that the socket policy allowed connections from the incoming Flash Player. Without a socket policy server, communications cannot be established between a web browser and server-side applications. However, many existing conference call systems were implemented before server implementations had become widespread and before socket policies had been standardized by a broader committee. With the proliferation of telephone technologies between 2011 and today, a solution for synchronizing data between user interfaces and backend services is greatly needed.

A company with an existing conference call or telephony system may therefore need a way to remotely administer its system in real-time. The systems and methods described herein facilitate the remote administration of existing conference call or telephony systems. The systems and methods described herein utilize a Flash User Interface, Flash's socket client, a socket policy server module, and a conference system that supports TCP socket-based control. For example, both ASTERISK and FREESWITCH are popular open source conference call systems with control sockets. The socket policy server module may facilitate timely, low-latency, two-way socket communications between customer facing user interfaces and telephony backend services.

A company may want to allow a remote user to manage its existing conference call system while avoiding the challenges described above. FIG. 1 illustrates an exemplary system 100 for integrating a conference call system management module with an existing conference call system to provide a socket policy server. The system 100 may facilitate easier access to conference call system features and data for the purpose of creating remote management user interfaces. The system 100 includes at least one user device 102, a conference server 112, a control socket 120, and a policy socket 122. The conference server 112 may be associated with a business entity seeking to create remote management user interfaces for an existing conference call system.

The at least one user device 102 may be associated with a user that wants to remotely manage a conference call system. The at least one user device 102 may include a user browser 104. The user browser 104 may be any web browser. For example, the web browser 104 may be any of CHROME, FIREFOX, EDGE, or any other web browser. The user browser 104 may include a flash player 106 and the flash player 106 may include a socket client 108 and a user interface 110. The user browser 104 may be where the flash player 106 executes. The flash player 106 may include any compatible flash player, such as any compatible flash player distributed by Adobe, Macromedia, or any other party. The user interface 110 may display the information executed on the user browser 104.

The user interface 110 may implement a number of the functions and techniques described herein. For example, the user interface may initiate a socket connection to a socket server, such as the socket server 116. The socket server may be part of a conference system, such as conference system 114, and the conference system may be included in the conference server 112. To initiate the socket connection to the socket server, the user interface may use a socket client, such as the socket client 108, to initiate the socket connection. The socket client 108 may be a flash player socket client. The socket client 108 may be configured to handle the creation of sockets, such as TCP sockets, during the execution of runtime code. To handle the creation of sockets during the execution of runtime code, the socket client 108 may check for the existence of a socket policy server and check for the validity of any returned socket policy. Errors in returned socket policies may be emitted for handling by the user interface 110.

The conference server 112 may be a computer system comprised of random-access memory (RAM) and a network peripheral such that it can execute software associated with a conference system, such as the conference system 114. The conference server 112 may include a conference system 114 and a socket policy server module 118. The conference system 114 may include a socket server 116 and the socket policy server module 118 may include an independent socket server 124. The conference system 114 may be a conference system that is configured to host conference calls, such as live conference calls. The live conference calls may be conference calls that a remote user associated with the user interface 110 wants to administer. The conference system 114 may implement a number of the functions and techniques described herein. For example, the independent socket server 124 may accept incoming socket connection requests from the user interface 110. The socket policy server module 118 may be a module that is configured to create an independent socket server 124. The independent socket server 124 may handle socket policy requests from the user interface 110 for incoming TCP socket connections.

The control socket 120 may be a socket that is configured to retrieve information and control the behavior of a conference system, such as the conference system 114. The control socket 120 may be established between the socket client 108 and the socket server 116 of the conference system 114. For example, the control socket 120 may be established between the socket client 108 and the socket server 116 of the conference system 114 by TCP connection request after the socket policy has been validated by a socket policy request through the policy socket 122. The policy socket 122 may be a socket connection, such as a socket connection on TCP port 843, that is established as part of a socket policy request from the flash player 106 in a user browser 104 to the socket policy server module 110. The socket policy may be served by the socket policy server module 118 through the policy socket 122 for the purpose of granting permission to runtime code of the flash player 106 to allow socket connections to socket server 116 and independent socket server 124 on the conference server 112.

Figure 2:
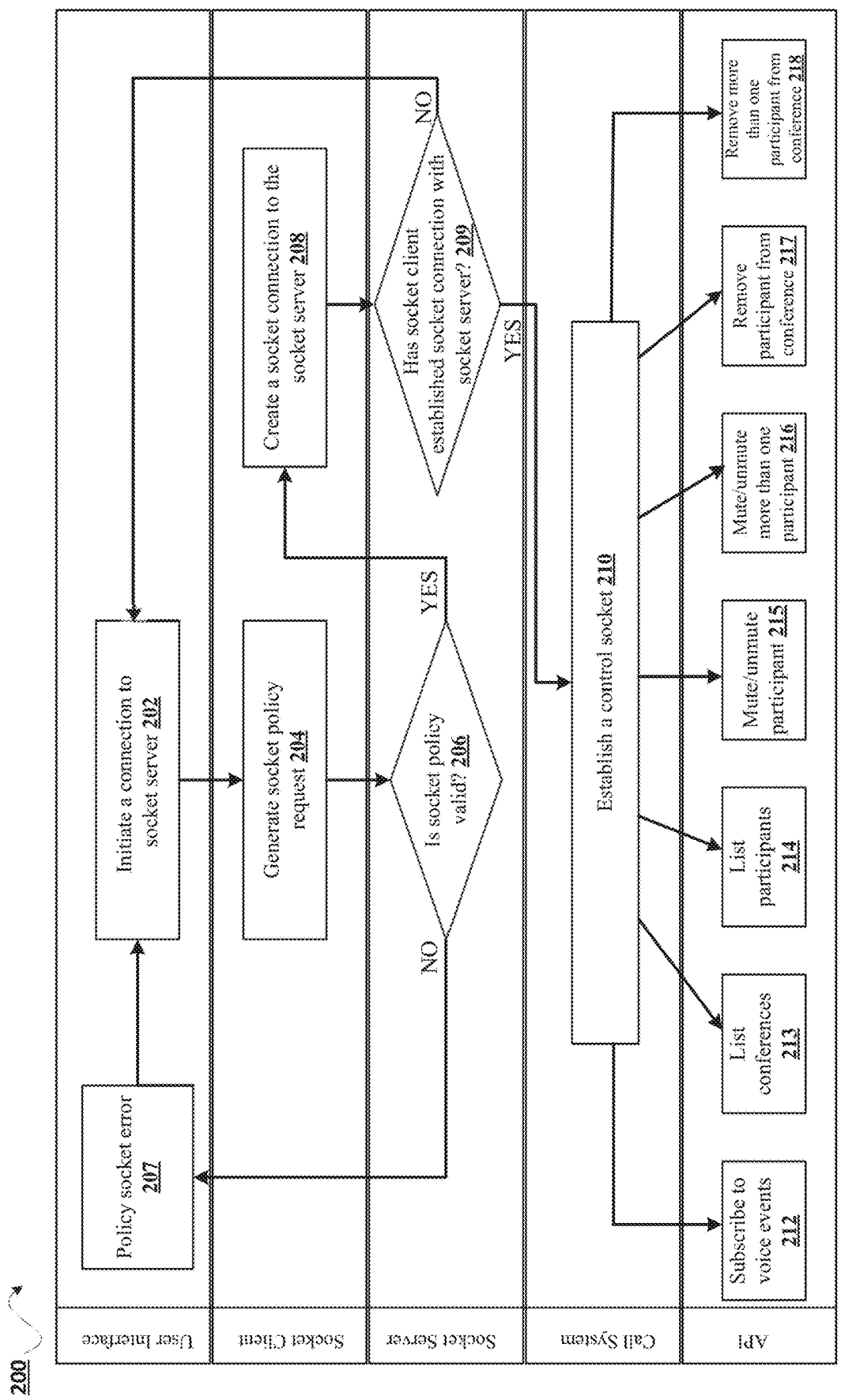
FIG. 2. illustrates a flow chart of an example method for initiating a connection between a socket client and a socket server and establishing a control socket according to an embodiment of the present disclosure.

The socket policy server module 110 may implement a number of the functions and techniques described herein. For example, as illustrated in FIG. 2, socket policy server module 110 may implement a method 200 to allow remote administration of a conference call system. A user interface may create a socket connection request, which may cause the socket client to initiate a connection to the socket server of a conference system. If the socket client initiates a connection to the socket server of the conference system, the socket client may generate a socket policy request, which may be handled by the socket policy server module. The socket client may then verify the validity of the socket policy before proceeding with the socket connection requested by the user interface. Once connected, the user interface may gain access to the conference system API required in order to enable a user associated with the user interface to administer conference calls on the conference system.

At step 202, a connection may be initiated to a socket server, such as the independent socket server 124 of FIG. 1. For example, a user interface, such as the user interface 110 may use a socket client, such as the socket client 108, to initiate a connection to the socket server of a conference system, such as the conference system 114. If the user interface uses a socket client, to initiate a connection to the socket server of a conference system, the socket client may generate a socket policy request before proceeding with the connection requested by the user interface. At step 204, the socket policy request may be generated. For example, the socket policy request may be generated by the socket client after it has been requested by the user interface to establish a socket connection to the socket server. To generate the socket policy request, the socket client may create a socket connection with a socket policy server module, such as the socket policy server module 118. The socket policy server module may be configured to serve out the relevant socket policy from the system random-access memory (RAM).

At step 206, it may be determined if the socket policy returned by the socket policy server module is valid. If the generated socket policy is not valid, the method 200 may proceed to step 207. The generated socket policy may not be valid if it prohibits the socket client from connecting to the socket server in any way. At step 207, a policy socket error may be emitted. The policy socket error may indicate that the generated socket policy is not valid. After the policy socket error is emitted, the method may return to step 202. Conversely, if the socket policy returned by the socket policy server module is valid, the method 200 may proceed to step 208. The socket policy returned by the socket policy server module may be valid if it allows a connection between the socket client and the socket server. At step 208, a socket connection, such as a standard TCP socket connection, to the socket server may be created. The socket connection may be established with the socket server requested in the socket connection requests from the user interface.

At step 209, it may be determined if the socket client has successfully established a socket connection with the socket server. If the socket client fails to establish a socket connection with the socket server for any reason, an error is generated by the socket client while establishing a connection. If an error is generated by the socket client while establishing a connection, an error message may be emitted to the user interface. The error message may cause the user interface to restart the socket connection request. To restart the socket connection request, the method 200 may return to step 202. Conversely, if the socket client has successfully established a socket connection with the socket server, an error is not generated by the socket client while establishing a connection, and the method may proceed to step 210.

At step 210, a control socket may be established. The control socket may be a TCP socket between the user interface and the conference system. The established control socket may allow the user interface to control the conference system through an API of the conference system. Once the control socket is established, a remote user may be able to administer calls on the conference system. To control the conference system through the conference system API, the user interface may proceed to one or more of steps 212-218 to administer API features exposed by the conference system. If the user interface proceeds to more than one of steps 212-218, the user interface may proceed to the steps in any order.

At step 212, the user interface may subscribe to voice events. By subscribing the voice events, the user interface may be able to detect voice activity of conference participants. At step 213, the user interface may access or edit a listing of all available conferences on the conference system. At step 214, the user interface may access or edit a listing of individual conference participants within a given conference on the conference system. At step 215, the user interface may at least one of mute or unmute a participant in a conference on the conference system. If the user interface mutes a participant in a conference, the audio associated with that muted participant may no longer be heard by other participants in the conference. Similarly, if the user interface unmutes a muted participant in a conference, the audio associated with the now unmuted participant may once again be heard by other participants in the conference. At step 216, the user interface may at least one of mute or unmute more than one participant in a conference. For example, the user interface may simultaneously mute or unmute more than one participant in a conference. In an embodiment, the user interface may mute or unmute all of the participants in a conference or all of the participants in a conference excluding one or more leaders of the conference.

At step 217, the user interface may remove a participant of a conference from the conference. If the user interface removes a participant from a conference, that participant may become disconnected from the conference and may no longer be able to interact with the other participants in the conference. For example, it may be desirable to remove a participant if that participant is behaving inappropriately or rudely, or if the participant is no longer needed in the conference. At step 218, the user interface may remove more than one participant of a conference from the conference. For example, the user interface may simultaneously remove more than one participant out of the conference. If the user interface removes more than one participant from a conference, those participants may become disconnected from the conference and may no longer be able to interact with the other participants in the conference. In an embodiment, the user interface may remove all of the participants from a conference.

Figure 3:
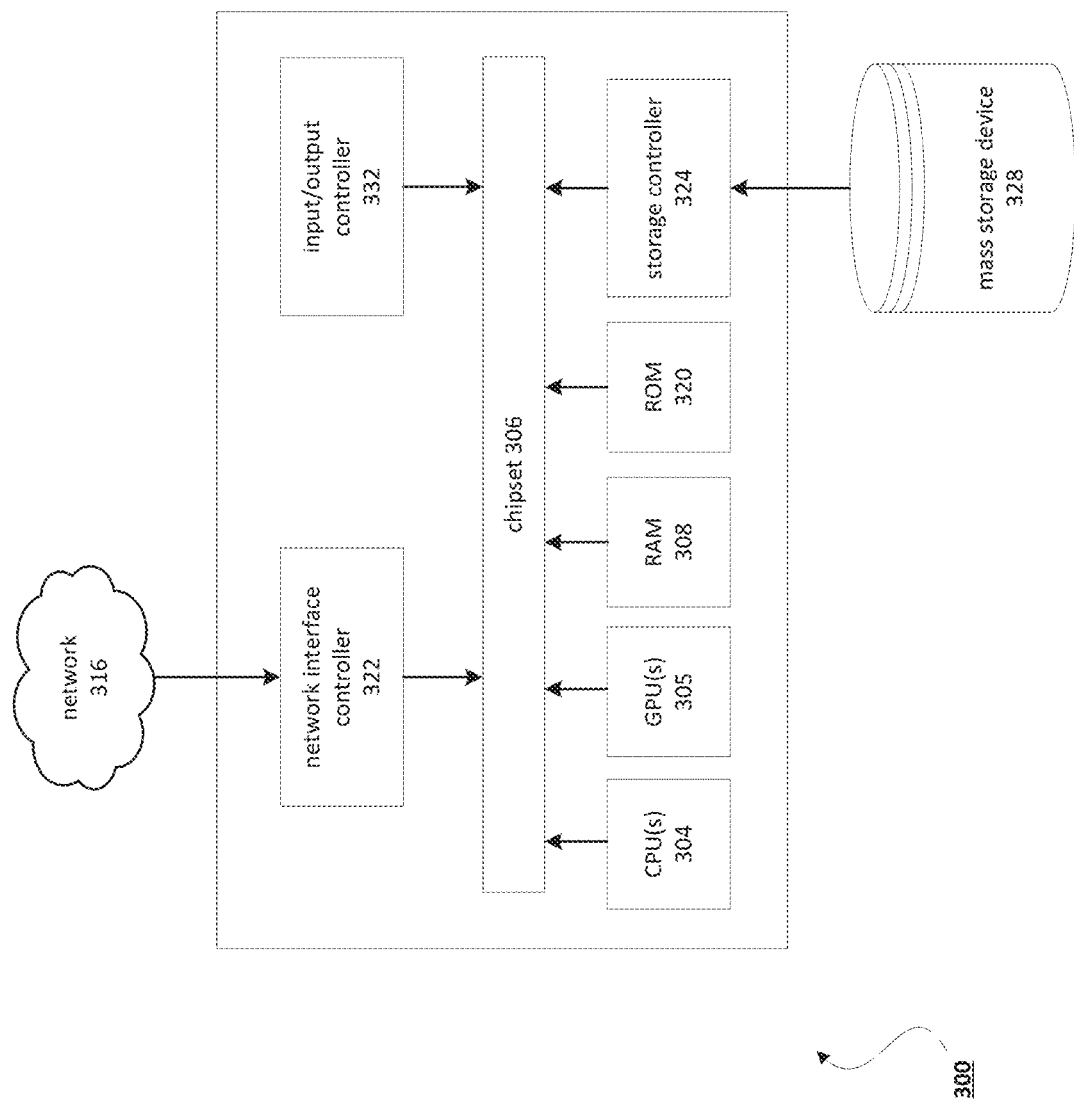
FIG. 3 illustrates an example computing device according to an embodiment of the present disclosure.

FIG. 3 depicts a computing device that may be used in various aspects. With regard to the example system of FIG. 1, one or more of the at least one user device 102, the conference server 112, the control socket 120, and the policy socket 122 may be implemented in an instance of a computing device 300 of FIG. 3. The computer architecture shown in FIG. 3 shows a conventional server computer, workstation, desktop computer, laptop, tablet, network appliance, PDA, e-reader, digital cellular phone, or other computing node, and may be utilized to execute any aspects of the computers described herein, such as to implement the method described in FIG. 2.

The computing device 300 may include a baseboard, or "motherboard," which is a printed circuit board to which a multitude of components or devices may be connected by way of a system bus or other electrical communication paths. One or more central processing units (CPUs) 304 may operate in conjunction with a chipset 306. The CPU(s) 304 may be standard programmable processors that perform arithmetic and logical operations necessary for the operation of the computing device 300.

The CPU(s) 304 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 304 may be augmented with or replaced by other processing units, such as GPU(s) 305. The GPU(s) 305 may comprise processing units specialized for but not necessarily limited to highly parallel computations, such as graphics and other visualization-related processing.

A user interface may be provided between the CPU(s) 304 and the remainder of the components and devices on the baseboard. The interface may be used to access a random access memory (RAM) 308 used as the main memory in the computing device 300. The interface may be used to access a computer-readable storage medium, such as a read-only memory (ROM) 320 or non-volatile RAM (NVRAM) (not shown), for storing basic routines that may help to start up the computing device 300 and to transfer information between the various components and devices. ROM 320 or NVRAM may also store other software components necessary for the operation of the computing device 300 in accordance with the aspects described herein. The user interface may be provided by a one or more electrical components such as the chipset 306.

The computing device 300 may operate in a networked environment using logical connections to remote computing nodes and computer systems through local area network (LAN) 316. The chipset 306 may include functionality for providing network connectivity through a network interface controller (NIC) 322, such as a gigabit Ethernet adapter. A NIC 322 may be capable of connecting the computing device 300 to other computing nodes over a network 316. It should be appreciated that multiple NICs 322 may be present in the computing device 300, connecting the computing device to other types of networks and remote computer systems.

The computing device 300 may be connected to a storage device 328 that provides non-volatile storage for the computer. The storage device 328 may store system programs, application programs, other program modules, and data, which have been described in greater detail herein. The storage device 328 may be connected to the computing device 300 through a storage controller 324 connected to the chipset 306. The storage device 328 may consist of one or more physical storage units. A storage controller 324 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 300 may store data on a storage device 328 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 328 is characterized as primary or secondary storage and the like.

For example, the computing device 300 may store information to the storage device 328 by issuing instructions through a storage controller 324 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 300 may read information from the storage device 328 by detecting the physical states or characteristics of one or more particular locations within the physical storage units.

In addition or alternatively to the storage device 328 described herein, the computing device 300 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 300.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 328 depicted in FIG. 3, may store an operating system utilized to control the operation of the computing device 300. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The storage device 328 may store other system or application programs and data utilized by the computing device 300.

The storage device 328 or other computer-readable storage media may also be encoded with computer-executable instructions, which, when loaded into the computing device 300, transforms the computing device from a general-purpose computing system into a special-purpose computer capable of implementing the aspects described herein. These computer-executable instructions transform the computing device 300 by specifying how the CPU(s) 304 transition between states, as described herein. The computing device 300 may have access to computer-readable storage media storing computer-executable instructions, which, when executed by the computing device 300, may perform the methods described in relation to FIGS. 2-4.

A computing device, such as the computing device 300 depicted in FIG. 3, may also include an input/output controller 332 for receiving and processing input from a number of input devices, such as a keyboard, a mouse, a touchpad, a touch screen, an electronic stylus, or other type of input device. Similarly, an input/output controller 332 may provide output to a display, such as a computer monitor, a flat-panel display, a digital projector, a printer, a plotter, or other type of output device. It will be appreciated that the computing device 300 may not include all of the components shown in FIG. 3, may include other components that are not explicitly shown in FIG. 3, or may utilize an architecture completely different than that shown in FIG. 3.

As described herein, a computing device may be a physical computing device, such as the computing device 300 of FIG. 3. A computing node may also include a virtual machine host process and one or more virtual machine instances. Computer-executable instructions may be executed by the physical hardware of a computing device indirectly through interpretation and/or execution of instructions stored and executed in the context of a virtual machine.

One skilled in the art will appreciate that the systems and methods disclosed herein may be implemented via a computing device that may comprise, but are not limited to, one or more processors, a system memory, and a system bus that couples various system components including the processor to the system memory. In the case of multiple processors, the system may utilize parallel computing.

For purposes of illustration, application programs and other executable program components such as the operating system are illustrated herein as discrete blocks, although it is recognized that such programs and components reside at various times in different storage components of the computing device, and are executed by the data processor(s) of the computer. An implementation of service software may be stored on or transmitted across some form of computer-readable media. Any of the disclosed methods may be performed by computer-readable instructions embodied on computer-readable media. Computer-readable media may be any available media that may be accessed by a computer. By way of example and not meant to be limiting, computer-readable media may comprise "computer storage media" and "communications media." "Computer storage media" comprise volatile and non-volatile, removable and non-removable media implemented in any methods or technology for storage of information such as computer-readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer. Application programs and the like and/or storage media may be implemented, at least in part, at a remote system.

As used in the specification and the appended claims, the singular forms "a," "an" and "the" include plural referents unless the context clearly dictates otherwise. Ranges may be expressed herein as from "about" one particular value, and/or to "about" another particular value. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A system comprising:
   at least one computing device including a conference server configured to communicate with a web browser including a user interface and a socket client, the conference server including a conference system including a socket server, the at least one computing device configured to:
   receive, from the user interface, a first request to connect to the conference system;
   generate, based on the first request to connect to the conference system, a first socket policy request configured to initiate a connection between the socket client and the socket server;
   determine that the first socket policy request is valid;
   establish a first socket connection configured to connect the socket client to the socket server;
   determine, based on the first socket connection, that the socket client is connected to the socket server; and
   establish a control socket between the user interface and the conference system, the control socket configured to allow the user interface to control at least one feature of the conference system.

2. The system of claim 1, wherein the at least one computing device is further configured to:
   receive, from the user interface, a second request to connect to the conference system;
   generate, based on the second request to connect to the conference system, a second socket policy request configured to initiate a connection between the socket client and the socket server;
   determine that the second socket policy request is not valid; and
   generate a socket policy error associated with the second socket policy request.

3. The system of claim 1, wherein the at least one computing device is further configured to:
   receive, from the user interface, a second request to connect to the conference system;
   generate, based on the second request to connect to the conference system, a second socket policy request configured to initiate a connection between the socket client and the socket server;
   determine that the second socket policy request is valid;
   establish a second socket connection configured to connect the socket client to the socket server;
   determine, based on the second socket connection, that the socket client is not connected to the socket server;
   generate an error associated with the second socket connection; and
   cause an error message indicative of the error to be output to the user interface.

4. The system of claim 3, wherein the error message is configured to cause the user interface to initiate a new request to connect to the conference system.

5. The system of claim 1, wherein the first socket connection is a TCP socket connection.

6. The system of claim 1, wherein the at least one feature of the conference system includes one or more of:
   a voice detection feature configured to detect voice activity associated with one or more participants in conferences hosted on the conference system;
   one or more lists of conferences hosted on the conference system;
   one or more lists of participants in conferences hosted on the conference system;
   a mute feature configured to mute one or more participants in conferences hosted on the conference system;
   an unmute feature configured to unmute one or more participants in conferences hosted on the conference system; and
   a remove feature configured to remove one or more participants from conferences hosted on the conference system.

7. The system of claim 1, wherein the first socket policy request is valid if the first socket policy server allows a connection between the socket client and the socket server.

8. The system of claim 1, wherein the control socket is configured to allow the user interface to control at least one feature of the conference system through an API of the conference system.

9. A method comprising:
   receiving, from a user interface associated with a web browser, a first request to connect to a conference system;
   generating, based on the first request to connect to the conference system, a first socket policy request configured to initiate a connection between a socket client of the web browser and a socket server of the conference system;
   determining that the first socket policy request is valid;
   establishing a first socket connection configured to connect the socket client to the socket server;
   determining, based on the first socket connection, that the socket client is connected to the socket server; and
   establishing a control socket between the user interface and the conference system, the control socket configured to allow the user interface to control at least one feature of the conference system.

10. The method of claim 9, further comprising:
    receiving, from the user interface, a second request to connect to the conference system;
    generating, based on the second request to connect to the conference system, a second socket policy request configured to initiate a connection between the socket client and the socket server;
    determining that the second socket policy request is not valid; and
    generating a socket policy error associated with the second socket policy request.

11. The method of claim 9, further comprising:
receiving, from the user interface, a second request to connect to the conference system;
generating, based on the second request to connect to the conference system, a second socket policy request configured to initiate a connection between the socket client and the socket server;
determining that the second socket policy request is valid;
establishing a second socket connection configured to connect the socket client to the socket server;
determining, based on the second socket connection, that the socket client is not connected to the socket server;
generating an error associated with the second socket connection; and
causing an error message indicative of the error to be output to the user interface.

12. The method of claim 11, wherein the error message is configured to cause the user interface to initiate a new request to connect to the conference system.

13. The method of claim 9, wherein the at least one feature of the conference system includes one or more of:
a voice detection feature configured to detect voice activity associated with one or more participants in conferences hosted on the conference system;
one or more lists of conferences hosted on the conference system;
one or more lists of participants in conferences hosted on the conference system;
a mute feature configured to mute one or more participants in conferences hosted on the conference system;
an unmute feature configured to unmute one or more participants in conferences hosted on the conference system; and
a remove feature configured to kick out one or more participants from conferences hosted on the conference system.

14. The method of claim 9, wherein the first socket policy request is valid if the first socket policy server allows a connection between the socket client and the socket server.

15. The method of claim 9, wherein the control socket is configured to allow the user interface to control at least one feature of the conference system through an API of the conference system.

16. The method of claim 9, wherein the first socket connection is a TCP socket connection.

17. A system comprising:
a web browser including a user interface and a socket client;
a conference system including a socket server; and
at least one computing device in communication with the web browser and the conference system, the at least one computing device configured to:
generate a socket policy request configured to initiate a connection between the socket client and the socket server;
establish, based on the socket policy request, a socket connection configured to connect the socket client to the socket server; and
establish, based on the socket connection, a control socket between the user interface and the conference system, the control socket configured to allow the user interface to control at least one feature of the conference system.

18. The system of claim 17, wherein the at least one feature of the conference system includes one or more of:
a voice detection feature configured to detect voice activity associated with one or more participants in conferences hosted on the conference system;
one or more lists of conferences hosted on the conference system;
one or more lists of participants in conferences hosted on the conference system;
a mute feature configured to mute one or more participants in conferences hosted on the conference system;
an unmute feature configured to unmute one or more participants in conferences hosted on the conference system; and
a remove feature configured to kick out one or more participants from conferences hosted on the conference system.

19. The system of claim 17, wherein the control socket is configured to allow the user interface to control at least one feature of the conference system through an API of the conference system.

20. The system of claim 17, wherein the socket connection is a TCP socket connection.

* * * * *